United States Patent
Xu

(10) Patent No.: US 11,182,384 B2
(45) Date of Patent: Nov. 23, 2021

(54) EVENT-DRIVEN ARCHITECTURE USING ROLLING AGGREGATES

(71) Applicant: Visa International Service Association, San Francisco, CA (US)

(72) Inventor: Minghua Xu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 365 days.

(21) Appl. No.: 15/219,044

(22) Filed: Jul. 25, 2016

(65) Prior Publication Data

US 2018/0025054 A1 Jan. 25, 2018

(51) Int. Cl.
*G06F 16/2453* (2019.01)
*G06F 16/23* (2019.01)

(52) U.S. Cl.
CPC .... *G06F 16/24539* (2019.01); *G06F 16/2372* (2019.01)

(58) Field of Classification Search
CPC ......... G06F 17/30457; G06F 17/30463; G06F 17/30454; G06F 16/24539; G06F 16/2372
See application file for complete search history.

(56) References Cited

U.S. PATENT DOCUMENTS

| | | | |
|---|---|---|---|
| 7,526,409 B2 | 4/2009 | Ramacher | |
| 7,774,312 B2 | 8/2010 | Ngai | |
| 2002/0029273 A1* | 3/2002 | Haroldson | H04L 12/185 709/226 |
| 2005/0071320 A1* | 3/2005 | Chkodrov | G06F 16/24565 |
| 2009/0307128 A1* | 12/2009 | Fineout | G06Q 40/025 705/38 |
| 2010/0161677 A1* | 6/2010 | Zurek | G06F 16/24556 707/802 |
| 2011/0161387 A1* | 6/2011 | Krueger | G06F 17/30551 707/825 |
| 2012/0203689 A1* | 8/2012 | Parvis | G06Q 40/00 705/39 |
| 2013/0007390 A1* | 1/2013 | Factor | G06F 11/1471 711/162 |
| 2013/0346320 A1* | 12/2013 | Jin | G06Q 40/02 705/76 |
| 2014/0180811 A1* | 6/2014 | Boal | G06Q 30/0245 705/14.53 |
| 2015/0213316 A1* | 7/2015 | Vunic | G06K 9/00711 386/278 |
| 2015/0277794 A1* | 10/2015 | Tudor | G06F 3/0619 711/103 |

(Continued)

*Primary Examiner* — Hosain T Alam
*Assistant Examiner* — Anthony G Gemignani
(74) *Attorney, Agent, or Firm* — Kilpatrick Townsend & Stockton LLP

(57) ABSTRACT

Described herein are systems and methods in which key values associated with events are aggregated as those events are processed by an event processing engine. In some embodiments, the system maintains a number of key-value mappings associated with a plurality of key values to be updated. Each key value may be associated with a key log that can be accessed to quickly generate useful information while minimizing the number of operations needed to generate that information. The key log may be updated each time that the associated key value is updated in order to maintain a running history of key-value updates.

19 Claims, 6 Drawing Sheets

(56) References Cited

U.S. PATENT DOCUMENTS

| | | | |
|---|---|---|---|
| 2015/0286671 A1* | 10/2015 | Ebiyama | G06F 16/2308 |
| | | | 707/692 |
| 2015/0302406 A1* | 10/2015 | Pastore | G06Q 40/02 |
| | | | 705/44 |
| 2016/0005116 A1* | 1/2016 | Bouchard | G06Q 40/04 |
| | | | 705/37 |
| 2016/0104251 A1* | 4/2016 | Prakash | G06Q 20/3278 |
| | | | 705/30 |
| 2016/0112442 A1* | 4/2016 | Sourek | H04L 63/1416 |
| | | | 726/23 |
| 2017/0192879 A1* | 7/2017 | Athinathan | G06F 11/3668 |
| 2017/0344745 A1* | 11/2017 | Wadley | G06F 21/57 |

* cited by examiner

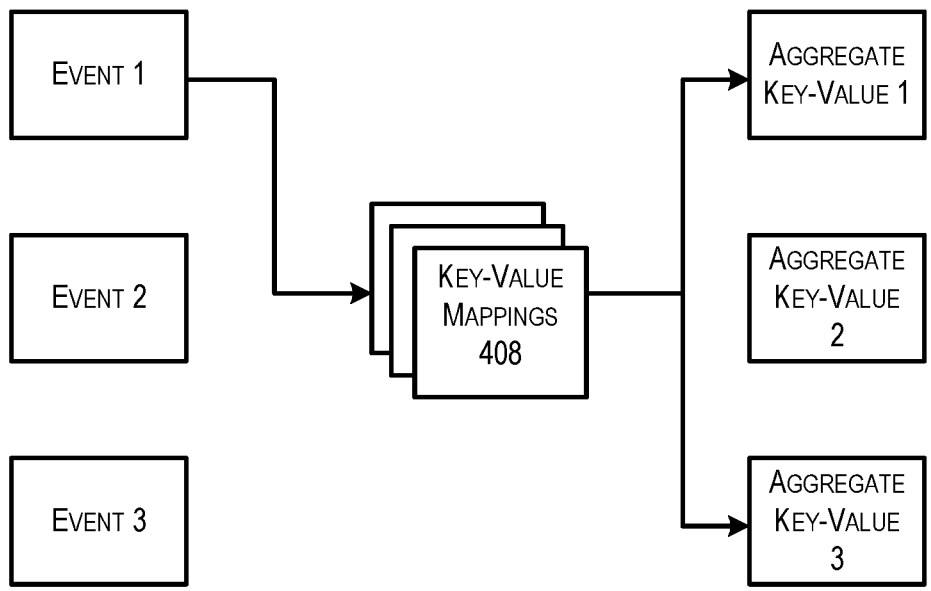
FIG. 4A
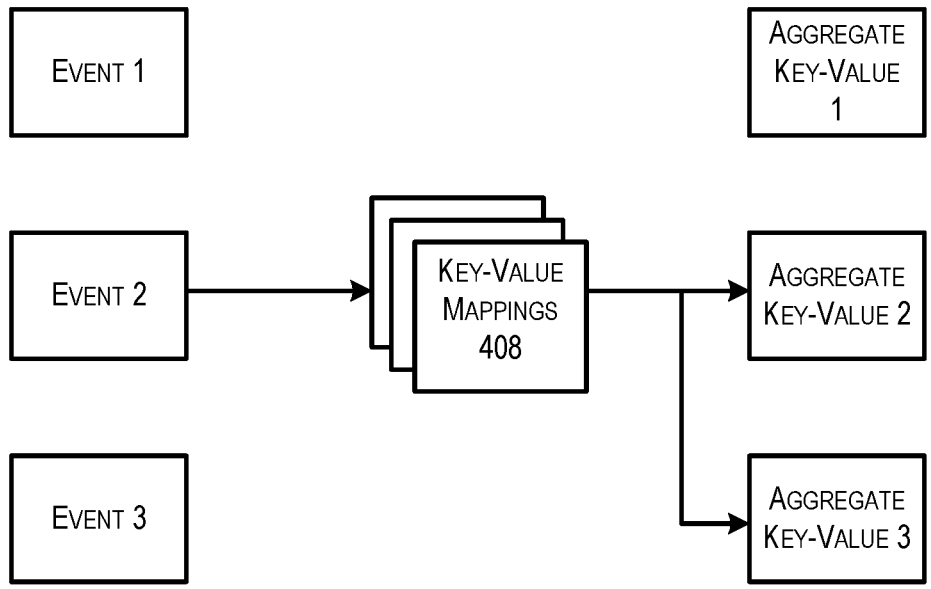
FIG. 4B
FIG. 4

EVENT-DRIVEN ARCHITECTURE USING ROLLING AGGREGATES

BACKGROUND

Event processing engines are typically configured to process a large number of events at any given time. A vast amount of information from these events is typically recorded with respect to each of these processed events. At a subsequent time, the information may be parsed and reports may be generated based on the stored information. However, as the stored event information grows, the computing power needed to generate useful data from that event information also grows and it becomes increasingly difficult and time consuming to generate useful data.

In some cases, users may wish to view reports on data aggregated from various events. For example, the users may wish to view a number of times that a particular user or type of user conducted a transaction at a particular type of merchant, as well as a type of resource associated with that transaction. In these cases, the stored event information must be queried to identify information that matches each of the specified conditions, which often results in a number of queries being performed on a database containing raw event data. This sort of processing can take up a lot of processing resources and time.

Embodiments of the invention address these and other problems, individually and collectively.

BRIEF SUMMARY

Embodiments of the invention are directed to a system in which key values associated with events are aggregated as those events are processed. In some embodiments, the system maintains a number of key-value mappings associated with a plurality of key values to be updated. Each key value may be associated with a key log that can be accessed to quickly generate useful information while minimizing the number of operations needed to generate that information.

One embodiment of the invention is directed to a method performed by a server device that comprises receiving an indication of an event including information associated with the event and determining, from the information associated with the event, a set of key values relevant to the event. The method further comprises, for each key value in the set of key values: identify a key-value mapping associated with the key value from a plurality of key-value mappings; identifying a current aggregate value of the key value; calculating a new aggregate value for the key value based on the key-value mapping; updating the current aggregate value of the key value to reflect the new aggregate value; and recording the new aggregate value and an update time in a key log. In some embodiments, the method may further comprise receiving a query request associated with the key value, identifying a past aggregate value from the key log based on a provided time period, and calculating a delta based on the current aggregate value and the past aggregate value.

Another embodiment of the invention is directed to an event processing engine comprising one or more processors, and a memory including instructions that, when executed by the one or more processors, cause the one or more processors to receive an event notification that includes information associated with an event, determine, based on the information associated with the event, a set of key-value mappings associated with the event, update a set of key values associated with the set of key-value mappings in accordance with the set of key-value mappings, and update each of a set of key logs associated with the set of key values to include a record of the of the update to the set of key values.

Another embodiment of the invention is directed to a processing node apparatus comprising a processor, and a memory including instructions that, when executed with the processor, cause the processing node to, at least receive a notification generated upon the occurrence of an event. The instructions further cause the processing node to identify, within the notification, a plurality of factors relevant to one or more key values, identify, for each key value in the one or more key values, a key-value mapping that includes instructions for updating an aggregate value stored in relation to the key value, update each key value of the one or more key values based at least in part on the key-value mapping, and for each key value of the one or more key values, update a key-value log to include information on the update to the key value.

These and other embodiments of the invention are described in further detail below.

BRIEF DESCRIPTION OF THE DRAWINGS

FIG. 4 depicts an illustrative example depicting the processing of an event according to key-value mappings in accordance with some embodiments of the disclosure;

FIG. 4A depicts an example processing of a first event (Event 1) according to information provided in a notification for the first event;

FIG. 4B depicts an example processing of a second event (Event 2) according to information provided in the second event;

FIG. 5A depicts a first example report generation that may be implemented in accordance with at least some embodiments;

FIG. 5B depicts a second example report generation that may be implemented in accordance with at least some embodiments.

DETAILED DESCRIPTION

Figure 1:
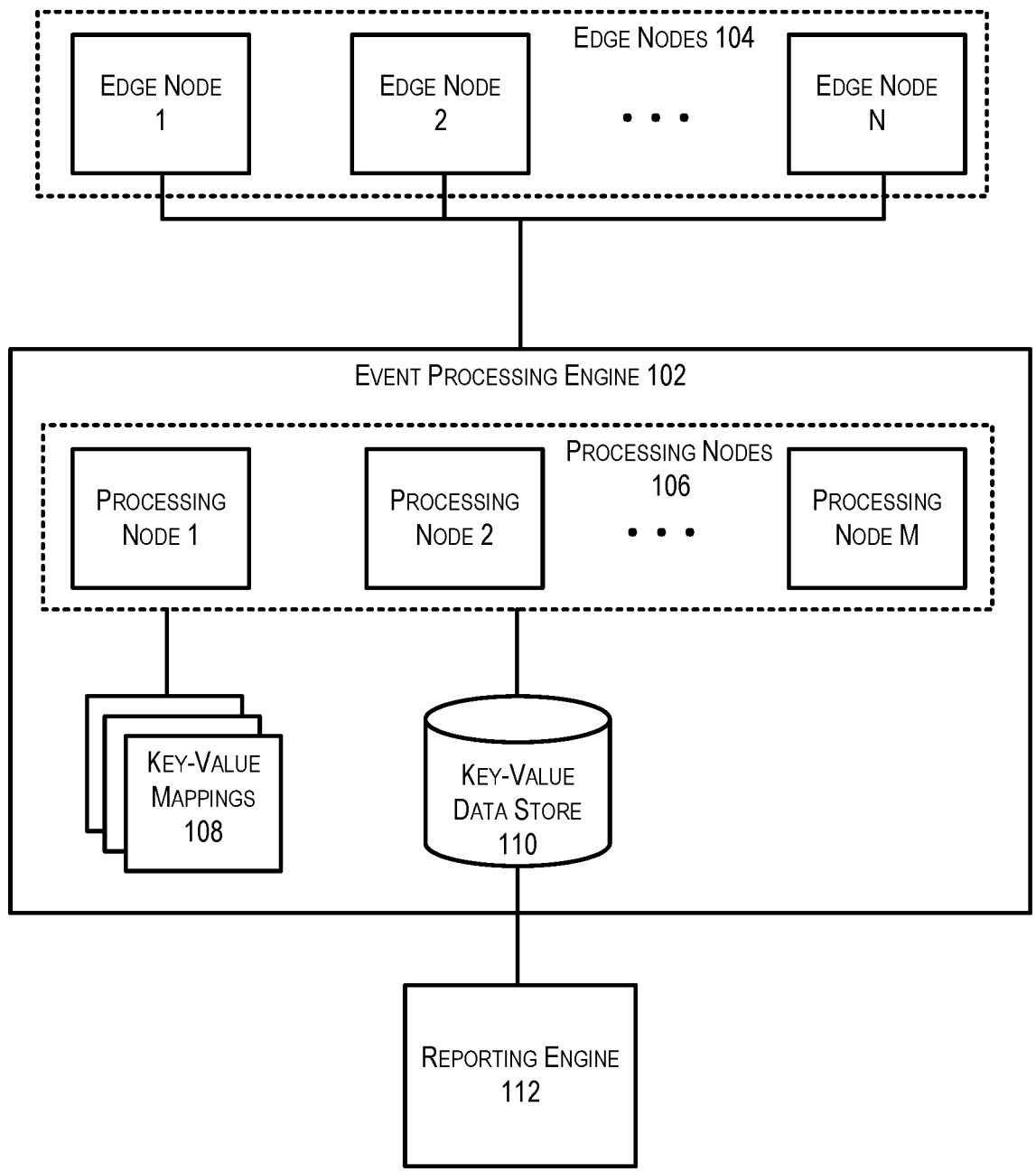
FIG. 1 depicts an example system architecture capable of implementing at least some embodiments of the current disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "event" may be the occurrence of any condition which may merit an update to a key value. In some embodiments, an event notification may be generated each time that an event occurs. These event notifications may comprise a number of details related to the event. For example, each time that a merchant conducts a transaction, that transaction may be an event. An event notification generated for the event may include an indication as to what resources were involved in the transaction, the parties to the transaction, an amount of currency exchanged in the transaction, or any other suitable transaction-related information. In another example, each time that a payment is made using a particular payment account, an event notification may be generated that includes information related to the payment. In some embodiments, event notifications may be pushed to an event processing engine (e.g., via an edge node). In some embodiments, the event notifications may be published, such that they may be collected (e.g., via an edge node). In some embodiments, an event notification may be generated each time that a transaction is conducted. In these embodiments, the event notification may include details related to the conducted transaction. Multiple events may originate from a user interaction or series of user interactions. For example, a user's login-in may triggers a login event. The user's subsequent interaction with an electronic shopping cart may trigger a shopping cart event. The user's checkout may trigger a payment event. Each of these events may result from a single transaction.

An "event processing engine" may be any computing device configured to process received event notifications. The event notifications may be received at the event processing engine from an edge node (via a push or a pull). The event processing engine may be configured to update values in a key-value data store based on information related to the events in accordance with key-value mappings. In some embodiments, an event processing engine may comprise multiple processing nodes, capable of processing multiple events at the same time. In some embodiments, processing nodes may be added to, or removed from, the event processing engine based on current event processing demands.

An "event source" may be any entity capable of generating event notifications. In some embodiments, an event source may generate a separate event each time that a transaction is conducted. Some example event sources may include merchant point of sale (POS) devices, a transaction processing network, website hosting servers, a server owned and/or operated by an acquirer entity, a server owned and/or operated by an issuer entity, or any other suitable device. An event source may generate an event notification automatically (e.g., without user interaction).

A "key log" may be any record of an update to a key value stored in association with a time. In some embodiments, a key log may comprise a text file stored in association with a key value. In some embodiments, a key log may comprise a series of database entries. In embodiments in which a key log is stored in a database, a separate database table may be dedicated to a key log for each key value. A key log is updated to each time that an associated key-value is updated. Some embodiments of the disclosure may not include a key value data store. In these embodiments, each respective key value may be stored in its associated key log as the latest update.

A "key value" is a data element that includes a key and a data value. For example, the key value may be a variable wherein the "key" is the name of the variable and the "value" is a value stored in association with the variable name. A key value may be stored such that a query on the key may be used to return the associated value.

An "key-value data store" may be any data store that stores computation results in a format having a primary key and one or more attribute values. In some embodiments, the key-value data store may comprise a database with each row representing a key value. In this example, the key-value data store may include at least two columns, one of which stores the key and one of which stores the value. In some embodiments the primary key may be a unique identifier in a database.

An "key-value mapping" may be any ruleset or instructions stored in association with a key value. In some embodiments, a key-value mapping may include an indication of mathematical formula or other instructions for updating the associated key value based on information received in an event notification. In some embodiments, the key-value mapping may include an indication of events or event types that are relevant to a particular key value, such that an event processing engine will select the key-value mapping each time that the type of event is received.

A "merchant" may typically be an entity that engages in transactions and can sell goods or services, or provide access to goods or services.

An "reporting engine" may be any computing entity capable of generating a report in accordance with embodiments of the disclosure. In some embodiments, the reporting engine may include a set of rules or protocols for generating a particular report. For example, the reporting engine may include a set of instructions for calculating a particular value from an aggregated key value using multiple aggregate values (e.g., a current aggregated value of that key value and a past aggregated key value). In some embodiments, the reporting engine may feed one or more key values to a machine learning algorithm in order to generate a predicted future value.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction" may be any interaction or exchange between two or more parties. For example, a transaction may include a first entity requesting resources from a second entity. In this example, the transaction is completed when the resources are either provided to the first entity or the transaction is declined.

Details of some embodiments of the present invention will now be described.

FIG. 1 depicts an example system architecture capable of implementing at least some embodiments of the current disclosure. In FIG. 1, an event processing engine 102 may receive event notifications from a plurality of edge nodes 104 (1-N). The event processing engine 102 may be distributed across multiple processing nodes 106 (1-M). The event processing engine 102 may have access to key-value mappings 108 used to generate key value data store 110. Key value data store 110 may be accessed by a reporting engine 112.

In some embodiments, an edge node 104 may be any device capable of receiving event notifications from one or more event sources (e.g., merchant POS devices, transaction processing network, etc.) and publishing them to an event processing engine 102. For example, an edge node may be a Hypertext Transfer Protocol (HTTP) network server configured to process transaction information and generate events. An edge node is typically a computer processing device that includes a central processing unit (CPU), random access memory (RAM), and at least some data storage (either solid state or hard disk) for storing event notification data. In some embodiments, an edge node 104 may receive event notifications from multiple event sources. Some embodiments of the described architecture may include thousands of edge nodes. The number of active edge nodes may be increased or decreased based upon demand. The edge nodes may be distributed throughout a geographic region or they may be grouped into one or more locations. Upon failure of one or more edge nodes, event notifications continue to be received by the remaining edge nodes.

Because notifications of events may be received from different types of event sources, some embodiments of the disclosure may include edge nodes that are configured to listen to an event stream from a particular event source. Each event notification may be associated with an event type that describes the event, a unique identifier, and/or a timestamp indicating the time at which the event occurred. A unique identifier may be created from a number of data related to the event notification. For example, a unique identifier for a particular event notification may be constructed to include an identifier of the edge node 104 at which it was received, a time at which it was received, a sequential indicator, or any other suitable identifying data. A single event type may be associated with multiple edge nodes 104. For example, a particular event type may be received from a number of different event sources and related event notifications may be published to the event processing engine 102 from a number of different edge nodes 104.

In some embodiments, the event processing engine 102 may be any computing device configured to receive events from an edge node 104 and update values in a key-value data store 110 based on information related to the events. In some embodiments, the event processing engine 102 may process information from the events according to a set of key-value mappings 108, which comprise an indication as to how each value in the key-value data store 110 is affected by certain events.

Processing performed by the event processing engine 102 may be performed by multiple processing nodes 106. Each processing node 106 (1-M) may represent a separate computing device (e.g., a separate server), a virtual machine, a separate thread in a multi-threaded system, or any other suitable processing device. A processing node 106 may be a computer processing device that includes a central processing unit (CPU) with a large amount of random access memory (RAM) and at least some data storage. In some embodiments, each processing node 106 may be configured to retrieve and process event notifications published by other components of the event processing engine 102.

In some embodiments, key-value mappings 108 may include an indication of key-values that are to be updated in the case of a particular event. In some embodiments, the key-value mappings 108 may include a separate data file for each key-value in the key-value data store. Key-value mappings 108 may include mathematical functions for updating the key-value based on information related to the event. In some embodiments, a key-value mapping may comprise an extensible markup language (xml) document or other suitable formatted document. In these embodiments, the key-value mappings 108 may comprise an xml database.

The key-value data store is typically a computer processing device that includes a central processing unit (CPU) with a large amount of random access memory (RAM), and a moderate amount of data storage. The key-value data store 110 may comprise temporary storage acting as a "write-buffer" between the processing node 106 and a data warehouse. In some embodiments, the key value data store 110 may comprise a database in the memory of the event processing engine 102. In some embodiments, key-value data may be replicated across multiple key-value data stores 110. In some embodiments, data may be written to the key-value data store 110 as the data becomes available.

The key-value data store 110 may include pastal data associated with key-values. For example, each time that a key-value is updated, a key log associated with that key-value may be updated to reflect the new value as well as a timestamp associated with the update. In this way, the key-value data store 110 may maintain a record of past values for a particular key value with an associated date. Each key-value stored in the key-value data store 110 may comprise a rolling aggregate value.

In some embodiments, the reporting engine 112 may be a computing device configured to generate reports from data values in a key-value data store 110 in accordance with embodiments of the disclosure. The reporting engine 112 may query information from the key-value data stores 110 and may calculate requested information from the query results. The key-value data stores 110 may include rolling aggregate values in accordance with embodiments of the disclosure.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
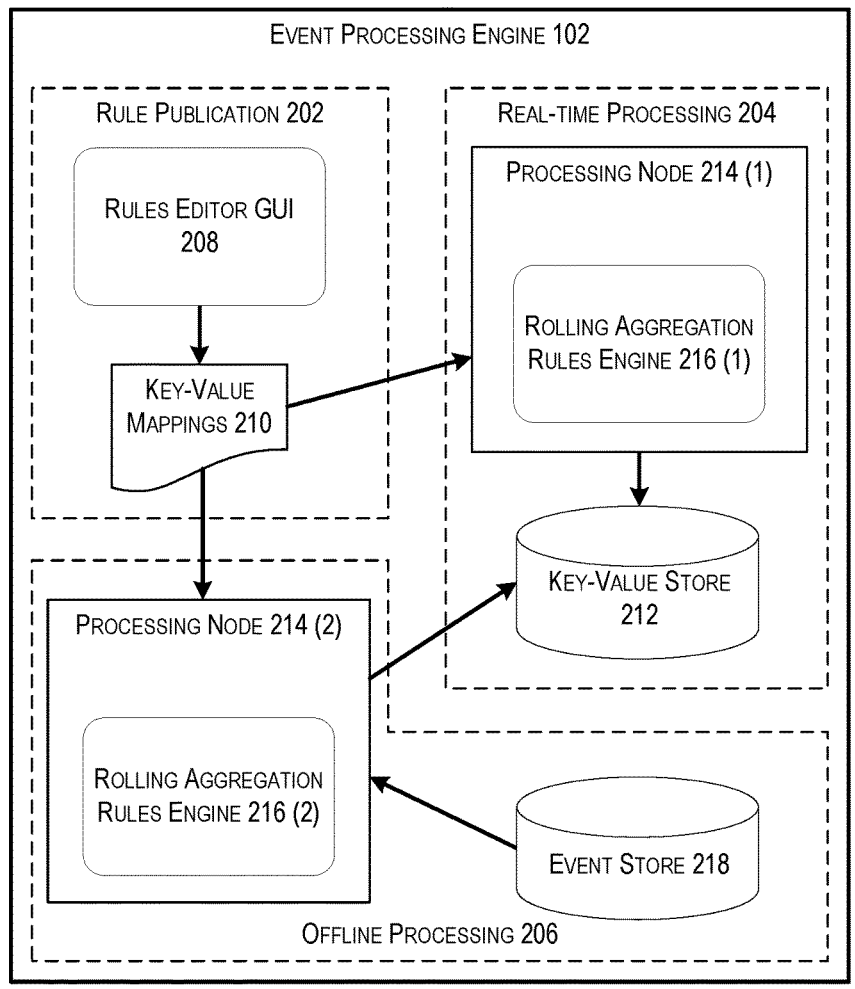
FIG. 2 depicts an example event processing engine in accordance with at least some embodiments.

FIG. 2 depicts an example event processing engine in accordance with at least some embodiments. In some embodiments, event processing engine 102 may be an example event processing engine 102 as depicted in FIG. 1. The event processing engine 102 may comprise processors and a computer readable memory including sets of computer executable instructions configured to cause the processors to perform rule publication, real-time processing, and offline processing.

In accordance with at least some embodiments, an event processing engine 102 may comprise a rule publication component 202, a real-time processing component 204, and/or an offline processing component 206. In some embodiments, each component of the event processing engine 102 may comprise a separate processor and computer-readable medium and may be configured to interact with other components of the event processing engine 102.

In some embodiments, each component of the event processing engine 102 may share a set of processors and computer readable medium.

In accordance with at least some embodiments, a rule publication component 202 may include a rule editor graphical user interface (GUI) 208 configured to enable users of the event processing engine 102 to create and/or edit key-value mappings 210. In some embodiments, the rule editor GUI 208 may be accessible to users via a network connection (e.g., using a web browser application).

A user may, upon accessing a rules editor GUI 208, create a new key-value mapping 210 by identifying a key value to be maintained in a key-value data store. In some embodiments, the user may then indicate what information from events is to be used in calculating the key-value along with any formulae necessary for calculating the key-value using that information. In some embodiments, the rules editor may determine input variables related to the identified key value and may generate a key-value mapping without further human interaction. A key-value mapping 210 may be created with these indications and published, such that future events will be used to update the associated key value in the key-value data store 212.

In accordance with at least some embodiments, the event processing engine 102 may comprise one or more instances of a processing node 214. For example, the event processing engine 102 may comprise a first instance of a processing node 214 (1) that performs real-time processing of received events. The event processing engine 102 may comprise a second instance of a processing node 214 (2) that performs offline processing of received events. Each instance of the processing node 214 may include a rolling aggregation rules engine 216, which receives key-value mappings 210 published by the rule publication component 202.

In some embodiments, received events may be stored in an event store 218. For example, in the case that an instance of the real-time processing node 214 (1) is unavailable or down, received events may be stored in the event store 218, which may be processed by an instance of the processing node 214 (2) configured to perform offline processing.

A processing node 214 may process received events in accordance with rules published in key-value mappings 210. To do this, the processing node 214 may, upon receiving an event to be processed, query the key-value mappings 210 to identify a set of key-value mappings relevant to the received event. For example, if the event includes a transaction for a particular resource or category of resource, the processing node 214 may query the key-value mappings 210 for a set of key-value mappings related to that resource or category of resource. The event may then be processed in accordance with that set of key-value mappings such that each of the key-values associated with the set of key-value mappings are updated based on instructions included in the set of key-value mappings. Additionally, a key log may be updated to include pastal key-value data. This process will be described in greater detail with respect to FIG. 3 below.

Figure 3:
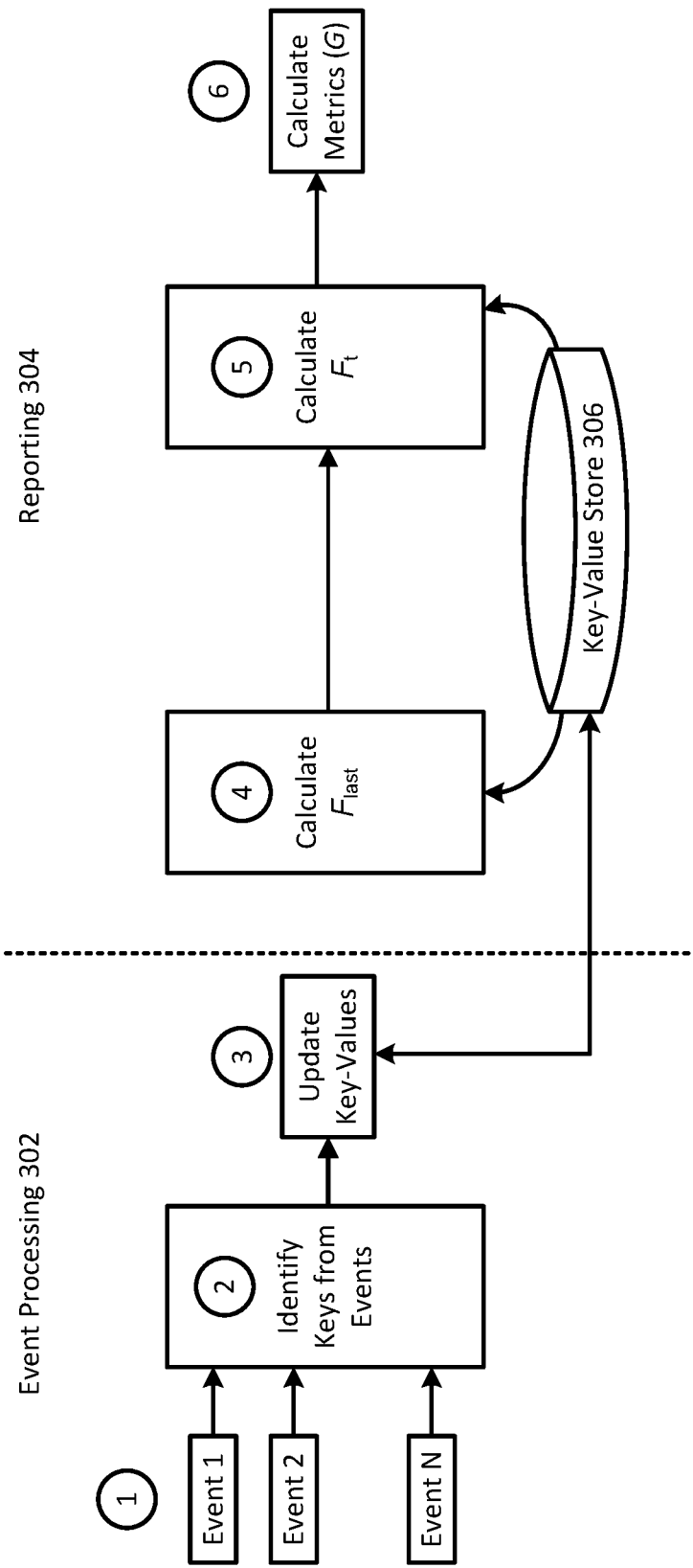
FIG. 3 depicts an example data flow that may be implemented to update key-values based on events and report data from stored key-values in accordance with at least some embodiments.

FIG. 3 depicts an example data flow that may be implemented to update key-values based on events and report data from stored key-values in accordance with at least some embodiments. In some embodiments, an example data flow may comprise an event processing phase 302 and/or a reporting phase 304. The event processing phase 302 depicted in FIG. 3 may be implemented at least by the event processing engine 102 depicted in FIG. 1 and/or FIG. 2. The reporting phase 304 depicted in FIG. 3 may be implemented at least by the reporting engine 112 depicted in FIG. 1. In some embodiments, an event processing engine and a reporting engine may be implemented on the same computing device.

At step 1 of the event processing phase 302, a plurality of events (1-N) may be received from event sources (e.g., merchant point of sale devices, acquirer computers, transaction processing networks, etc.). As events are received by the event processing engine, keys relevant to each event may be identified at step 2. For example, the event processing engine may query a set of key-value mappings to identify a subset of those key-value mappings that include an indication of a category or type associated with the event. In another example, the event may comprise transaction information associated with a particular item or type of item. In this example, the processing engine may query the set of key-value mappings to identify a subset of events that pertain to that item or type of item. The keys associated with the subset of key-value mappings are then identified as being relevant to the event. In some embodiments, multiple keys may be relevant to a single event. In some embodiments, no keys may be relevant to a particular event.

Upon identifying a set of keys relevant to an event, the processing engine may update values associated with each of those keys in a key-value store 306 at step 3. To do this, the processing engine may query a current value associated with the key ($F_{last}$). The processing engine may also identify rules (e.g., mathematical formulae) within the key-value mapping associated with the key that indicate how information in the event should be processed to update the key. To provide a simplified example, the key-value mapping associated with the key may indicate that a value associated with the event should be added to the current value associated with the event. In this example, the value associated with the key in the key-value data store 306 would be updated to be the sum of the retrieved current value associated with the key and the specified value associated with the event. Upon updating this value in the key-value store 306, a key log associated with the key may be updated to reflect the new value of the key and a timestamp associated with the update. In this way, a past record may be made of past values for the key and times at which those past values were updated. Accordingly, the current value stored in relation to the key-value is an aggregate value (e.g., it reflects all past events relevant to the key).

Although in some embodiments, an aggregate value may be calculated for the key-value to include a summation, it should be noted that a number of other techniques may be used to generate an aggregate value. For example, an aggregate value may place a greater or lesser weight on values from more recent events by using an edge function (e.g., a time-decay function). For example, when determining a new aggregate value $F_{new}$ based on an event, a key-value mapping may indicate that $F_{new}$ is to be calculated using:

$$F_{new}=M*F_{last}+(\text{event value})$$

where M is some multiplier and the event value is a value associated with the event. In some embodiments, M may be dependent on other factors. For example, M may be inversely proportional to an amount of time that has transpired between a current event and the last update to the key-value.

In some embodiments, a key-value mapping may cause both a key-value and a derivative key-value (e.g., a key-value derived from another key-value) to be updated. For example, each time that a key-value is updated based on an event, the key-value mapping may also cause a key-value to be updated that represents a variance for the key-value. In this example, a variance derivative key-value mapping may be calculated using:

$$\text{Variance} = F'_{new} = F'_{last}(\text{event value}) * (\text{event value})$$

where the event value is a value associated with the event. Accordingly, multiple key-values may be updated according to a single key-value mapping.

At step 4 of the reporting phase 304, a request for metrics may be received in relation to a particular key. In some embodiments, the request for metrics may include an indication of a period of time t. For example, the request may be for a change in value of a key over a 30 day period. In some embodiments, a particular metric may be inherently associated with a period of time t. For example, a requested metric may be relevant only over the last five minutes. A reporting engine may calculate a current value ($F_{last}$) for the key by querying the key-value store 306 based on the key. In some embodiments, the reporting engine may perform some calculation using $F_{last}$ based on one or more rules associated with the metric or the key.

At step 5 of the reporting phase 304, the reporting engine may retrieve a past value $F_t$ associated with the key from its respective key log. To do this, the reporting engine may process the key log to identify a value associated with the key at a specified period of time t (e.g., a period of time indicated in the request or a time period inherent to the metric). For example, the if the request indicates that the period of time t is the last five minutes, then the reporting engine will identify the last update made in the key log before a point in time five minutes ago. Accordingly, $F_t$ represents the value associated with the key at the point in time current time−t.

At step 6 of the reporting phase 304, the reporting engine may calculate the requested metric (G) based on $F_{last}$ and $F_t$. For example, to calculate a total change in the value of the key over the specified period of time t(Δ), the reporting engine may calculate $F_{last}-F_t$. In another example, to calculate an average rate of change in the value of the key over the specified period of time t, the reporting engine may calculate ($F_{last}-F_t$)/t. It should be noted that a number of metrics may be calculated from these values with varying complexity. In some embodiments, metrics may be calculated based on multiple past values associated with a particular key. In some embodiments, metrics may be calculated using a number of different key-values.

FIG. 4 depicts an illustrative example depicting the processing of an event according to key-value mappings in accordance with some embodiments of the disclosure. FIG. 4 is broken up into FIG. 4A and FIG. 4B to better illustrate the event processing described in the current disclosure. For the purposes of this illustrative example, assume that aggregate key-value 1 represents a sum total of dollars spent by users on electronics (a category of item), aggregate key-value 2 represents a sum total of dollars spent by users on groceries, and aggregate key-value 3 represents a sum total of dollars spent by users at Retailer A. It should be noted that these examples are merely illustrative in nature and are not intended to be limiting in any fashion.

FIG. 4A depicts an example processing of a first event (Event 1) according to information provided in a notification for the first event. For the purposes of this illustrative example, assume that Event 1 pertains to a transaction conducted at Retailer A in which a user purchased a television for $400.00, a couch for $500.00, and a television remote control for $5.00. During the processing of Event 1 by the processing engine, the processing engine may categorize each of the items involved with Event 1. In some embodiments, each item may be categorized based on an item identifier associated with the item. For example, item identifiers associated with each item may be stored in a database with an indication of one or more associated categories. In some embodiments, items involved in the transaction may be categorized based on a name or title of the item. Once each item has been categorized, a database of key-value mappings may be queried to identify key-value mappings associated with the item categorizations. In this case, the television and the television remote control may be classified as electronic devices, whereas the couch may be classified as a furniture item. Based on these categorizations, the database of key-value mappings may be queried to identify key-value mappings associated with both electronics and furniture. As a result of this query, aggregate key-value 1 should be identified as being relevant to Event 1.

In this example, a notification for Event 1 may also include a merchant identifier associated with the merchant at which the transaction was conducted (in this case, Retailer A). In some embodiments, the merchant identifier may be the name of the merchant or a nickname associated with the merchant. Upon identifying that Retailer A is associated with Event 1, the database of key-value mappings may be queried to identify key-value mappings associated with that merchant. As a result of this query, aggregate key-value 3 should be identified as being relevant to Event 1.

Continuing with the above example, key-value mappings 408 associated with each of aggregate key-value 1 and aggregate key-value 3 may be included in a subset of key-value mappings 408 according to which Event 1 will be processed. During processing of Event 1, the processing engine may determine that both the television and the television remote control are electronic devices for which aggregate key-value 1 should be updated. Based on this determination, the processing engine may query a current value of aggregate key-value 1 in a key-value data store, increment that value by the amount associated with both the television and the television remote ($405.00), update the value in the key-value data store to include the incremented value, and update a key log associated with aggregate key-value 1 to include the incremented value and a timestamp associated with the update.

Additionally, the processing engine may determine that Event 1 is associated with Retailer A, for which aggregate key-value 3 should be updated. Based on this determination, the processing engine may query a current value of aggregate key-value 3 in a key-value data store, increment that value by the amount associated with the total transaction ($905.00), update the value in the key-value data store to include the incremented value, and update a key log associated with aggregate key-value 3 to include the incremented value and a timestamp associated with the update.

FIG. 4B depicts an example processing of a second event (Event 2) according to information provided in the second event. For the purposes of this illustrative example, assume that Event 2 pertains to a transaction conducted at Retailer A in which a user purchased a carton of milk for $3.00. In this case, the carton of milk may be classified as a grocery item. Based on this categorization, the database of key-value mappings may be queried to identify key-value mappings associated with groceries. As a result of this query, aggregate key-value 2 should be identified as being relevant to Event 2. Once again, aggregate key-value 3 should be also be identified as being relevant to Event 2 because it pertains to Retailer A as well.

Continuing with the above example, key-value mappings 408 associated with each of aggregate key-value 2 and aggregate key-value 3 may be included in a subset of key-value mappings 408 according to which Event 2 will be processed. During processing of Event 2, the processing engine may determine that the carton of milk is a grocery item for which aggregate key-value 2 should be updated. Based on this determination, the processing engine may query a current value of aggregate key-value 2 in the key-value data store, increment that value by the amount associated with the carton of milk ($3.00), update the value in the key-value data store to include the incremented value, and update a key log associated with aggregate key-value 3 to include the incremented value and a timestamp associated with the update. Additionally, aggregate key-value 2 is updated in a fashion similar to that described above with respect to FIG. 4A.

It should be noted that multiple transactions may be performed with respect to a particular aggregate key-value at the same time. In some embodiments, a key-value may be locked while a particular processing engine is updating the value in order to prevent overwrite of any new value and may be released once the update is completed. In this way, processing nodes may be configured to wait until a key-value is unlocked before retrieving and updating that key-value. In some embodiments, each key-value may be associated with a queue in which a number of processing nodes are queued up to update the key-value in the order in which events were received.

Figure 5:
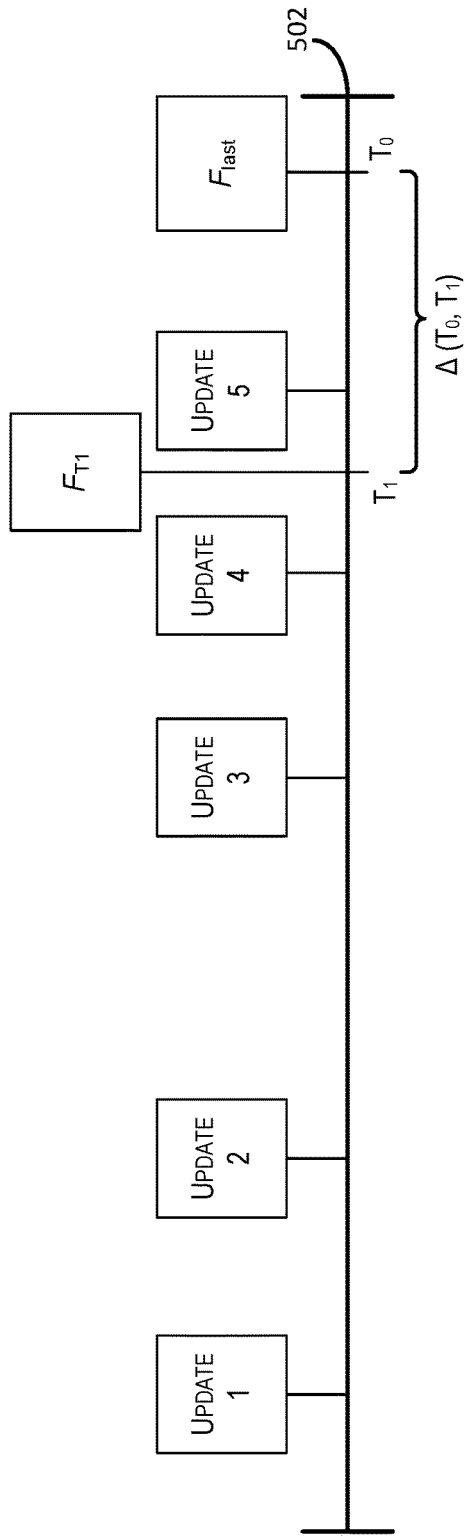
FIG. 5 depicts a process for calculating metrics using a rolling aggregate system in accordance with some embodiments of the disclosure.
Figure 5:
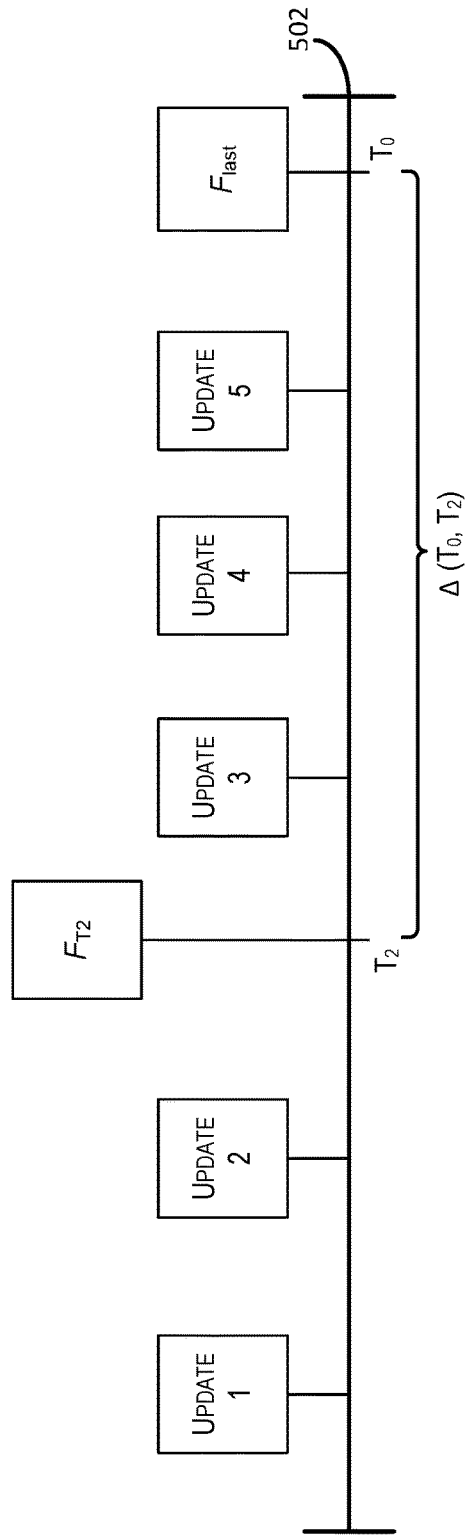

FIG. 5 depicts a process for calculating metrics using a rolling aggregate system in accordance with some embodiments of the disclosure. FIG. 5 is broken up into FIG. 5A and FIG. 5B to better illustrate the metric reporting process described in the current disclosure. Each of FIG. 5A and FIG. 5B depict a timeline 502 along which multiple updates 1-5 are depicted. In these illustrative examples, updates 1-5 may represent updates to a single key-value as may be determined from a key log associated with the key-value. Furthermore, the depicted examples pertain to reports generated for a metric measured between a past date and a current date. Upon receiving a request to generate a report for a metric pertaining to a particular key-value, a reporting engine may access a key log associated with the key-value.

FIG. 5A depicts a first example report generation that may be implemented in accordance with at least some embodiments. In this example, the report may pertain to a change in a key-value with respect to time ($\Delta$). To generate a report in the depicted example, the reporting engine may identify a current value ($F_{last}$) associated with the key-value (e.g., a value at time $T_0$) and a past value of the key-value at some time in the past $T_1$. It should be noted that, in some embodiments, time $T_0$ may be the time at which the report was generated and/or the time at which the key log was accessed as opposed to the actual current time. Additionally, $T_0$ may be some point in the past. For example, a report may pertain to a period of time from two months ago to one month ago. In this example, time $T_0$ would represent a time one month ago.

In some embodiments, a current value $F_{last}$ for the key-value may be determined by querying the key-value in a key-value data store. In some embodiments, the current value $F_{last}$ may be the identified as being the last value recorded in the key log associated with the key-value. In some embodiments, the reporting engine may calculate $F_{last}$ from a value of the key-value at $F_{T0}$ based on one or more rules associated with the metric or the key. For example, $F_{last}$ may be calculated by rounding the value of the key-value at $F_{T0}$ or taking an absolute value (e.g., $|F_{T0}|$).

In some embodiments, the reporting engine may retrieve a past value $F_{T1}$ associated with the key-value from its respective key log. For example, in the case that the request indicates that the report should include a metric reflecting some change in the key-value over a period of time from time $T_1$ to time $T_0$, the reporting engine will identify the last update made in the key log before time $T_1$ (in the present example, this is the value reflected in Update 4). Accordingly, $F_{T1}$ represents the value associated with the key at the point in time $T_1$.

The reporting engine may generate the requested report by calculating metrics based on $F_{last}$ and $F_{T1}$. For example, to calculate a total change in the key value over the period of time between $T_0$ and $T_1$, the reporting engine may calculate $F_{last}-F_{T1}$. To further this example, to calculate an average rate of change in the value of the key over the time between $T_0$ and $T_1$, the reporting engine may calculate $(F_{last}-F_{T1})/\Delta(T_0, T_1)$.

FIG. 5B depicts a second example report generation that may be implemented in accordance with at least some embodiments. In FIG. 5B, the timeline 502 may be used to generate a report based on the current value ($F_{last}$) associated with the key-value and a past key-value at some time $T_2$ in the past ($F_{T2}$). FIG. 5B is used to illustrate that, in some embodiments, the reporting engine may determine $\Delta$ in a number of different ways. For example, $\Delta(T_0, T_2)$ may represent a number of events that have occurred between time $T_2$ and time $T_0$. For example, in FIG. 5B, Updates 3, 4, and 5 each occur between time $T_2$ and time $T_0$. Accordingly, the reporting engine may determine that $\Delta(T_0, T_2)$ is three and may calculate an average change in the key-value per event between time $T_2$ and time $T_0$ as $(F_{last}-F_{T2})/3$.

Figure 6:
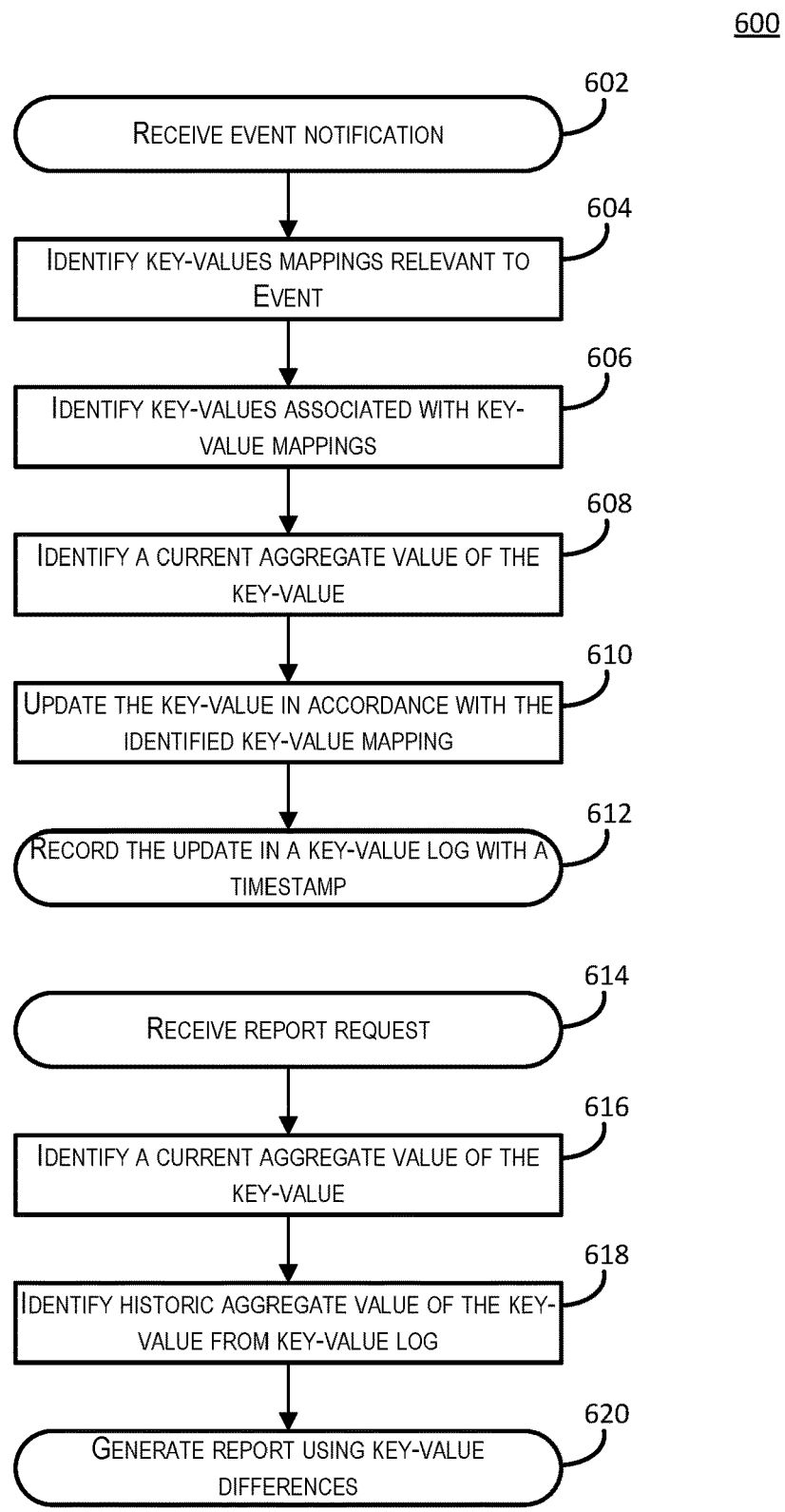
FIG. 6 depicts a flow diagram illustrating a process for updating key-value records and generating reports using aggregate key-value data in accordance with at least some embodiments.

FIG. 6 depicts a flow diagram illustrating a process for updating key-value records and generating reports using aggregate key-value data in accordance with at least some embodiments.

Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the event processing engine 102 and/or the reporting engine 112 depicted in FIG. 1. The code may be stored on a computer-readable storage medium, for example, in the form of a computer program including a plurality of instructions executable by one or more processors. The computer-readable storage medium may be non-transitory.

Process 600 may begin at 602, when an event notification is received by an event processing engine. In some embodiments, the event notification may be generated by an event source in response to the occurrence of an event. The event notification may include a number of details related to the event, items, and/or users associated with the event. For example, if the event is a transaction between two parties that results in a transfer of title for an item, the event notification may include identifiers for each of the parties, an identifier for the item, a cost value associated with the transaction, a time of the transaction, or any other suitable information. An event notification may also include an identifier for the event or a series of events (e.g., an identifier for a user session, etc.).

At 604, the event processing engine may identify key-value mappings associated with the event notification. In some embodiments, the key-value mappings may include an indication of an event or event type that are relevant to a particular key value, such that an event processing engine will select the key-value mapping each time that the type of event is received by the event processing engine. In some embodiments, the key-value mapping may include an indication of an item type or transaction type. Upon determining that the event is related to that item type and/or transaction type, the key-value mapping may be identified as being relevant.

At 606, the event processing engine may identify key-values relevant to the identified key value mappings. In some embodiment, the key-value mappings may each include an indication of one or more key values that they are associated with. In some embodiments, key-value mappings may be stored in an xml database in relation to their respective key values.

At 608, the event processing engine may identify a current aggregate value of the identified key value. In some embodiments, the event processing engine may query a key-value data store to obtain the current aggregate value of the key-value. In some embodiments, the event processing engine may access a key log associated with the key value and determine a value associated with the latest recorded update. In some embodiments, the event processing engine may apply a transformation function to the retrieved value in order to calculate a current aggregate value from that retrieved value. For example, the event processing engine may subject the retrieved value to a time-decay function based on an amount of time that has elapsed since the last update to the key value.

At 610, the event processing engine may update the current aggregate value of the identified key values in accordance with the identified key-value mappings. For example, the key-value mapping for Key Value A may include an indication that a particular value indicated in the event notification should be added to half of the current aggregate value. In this example, the event processing engine may update Key Value $A=V_{Event}+0.5*F_{last}$, where $F_{last}$ is the current aggregate value and $V_{Event}$ is the value indicated in the event notification. In some embodiments, the current aggregate value may be updated to reflect the new aggregate value calculated based on the event notification.

At 612, the event processing engine may record the update and a timestamp in a key log. In some embodiments, the key log may comprise a number of updates to the associated key value along with dates upon which the update was made. Each time that the event processing engine updates a key value, the event processing engine may also update the key log associated with that key value. In some embodiments, the event processing engine may only update the key log. In these embodiments, the key value in the key-value data store may be updated periodically to reflect the latest update in the key log associated with that key value.

At 614, a request may be received at a reporting engine in association with a particular metric and/or key-value. In some embodiments, the request may include instructions or mathematical formulae for calculating the requested metric from data related to the key-value. In some embodiments, the request may be received in the form of a query.

At 616, the reporting engine may identify a current aggregate key value associated with the key value. In some embodiments, the reporting engine may query a key-value data store to obtain the current aggregate value of the key-value. In some embodiments, the reporting engine may access a key log associated with the key value and determine a value associated with the latest recorded update.

At 618, the reporting engine may identify a past aggregate key value associated with the key value. The reporting engine may retrieve a past value associated with the key-value from its respective key log. For example, in the case that the request indicates that the report should include a metric reflecting some change in the key-value over a period of time, the reporting engine may identify a value associated with the last update made in the key log prior to the beginning of that period of time.

At 620, the reporting engine may generate a report based on differences between the current aggregate key value and the past aggregate key value. In some embodiments, the reporting engine may generate a report that includes information on multiple metrics. In some embodiments, a metric may be calculated using data associated with multiple key values.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention allow for more efficient and more scalable reporting of aggregated event data. Although storing aggregate values in the described fashion may result in a loss of specificity (e.g., specifics of a particular event may be lost), the significant decrease in the number of operations needed make embodiments of this disclosure ideal for some reporting systems that don't require specificity. For example, embodiments of the disclosure allow a reporting engine to quickly generate useful information while minimizing the number of operations needed to generate that information.

For example, in current systems in which users may wish to view reports on data aggregated from various events, the stored event information must be queried to identify information that matches each of the users' specified conditions. This often results in a number of queries being performed on a database containing a large amount of raw event data. This sort of data processing can take up a lot of processing resources and time. The current disclosure seeks to solve this problem in systems that do not require in-depth specificity. To do this, users may specify what key values they are interested in and what conditions within events should be used to calculate those values. Events are then processed as they are received and an aggregated value is stored. This aggregated value represents the current value at any given time, such that generating a report requires a single input/output operation. Additionally, some other metrics are made available via the use of the key-value log. This significantly reduces the processing resources and time needed to calculate any key value that needs to be reported.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of policies, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
    maintaining, in a data store for each of a number of event types, one or more key-value mappings between the event type and a different set of key values, the one or more key-value mappings indicating each key value in the different set of key values that is affected by an event of the event type as well as instructions for updating the key value;
    maintaining, in the data store for each key value stored by the data store, a corresponding key log indicating a current aggregate value of the key value;
    receiving an indication of an event including information associated with the event, wherein one or more data values in the data store are to be updated in accordance with the event, the one or more data values being separate from the set of key values;
    determining, from the information associated with the event, a set of key values relevant to the event, wherein the set of key values is determined by querying the data store based on an event type associated with the event and identifying a category of an item associated with the event;
    for each key value in the set of key values:
        identify a key-value mapping associated with the key value and event type from the data store as well as instructions for updating the key value;
        identifying, from the key log associated with the key value, a current aggregate value of the key value;
        calculating a new aggregate value for the key value based on the instructions for updating the key value included in the key-value mapping by multiplying the current aggregate value of the key value by some multiple value and then adding a new value from the information associated with the event to the multiplied current aggregate value, wherein said some multiple value is based on an amount of time that has transpired between a current event and a last update to the key value;
        updating the current aggregate value of the key value to reflect the new aggregate value; and
        recording the new aggregate value and an update time in the key log associated with the key value, wherein the new aggregate value differs from the one or more data values in the data store up dated in accordance with the event.

2. The method of claim 1, further comprising:
    receiving a query request associated with the key value, the query request including a time period;
    identifying a past aggregate value from the key log based on the time period; and
    calculating a delta based on the current aggregate value and the past aggregate value.

3. The method of claim 2, further comprising dividing the delta by the time period to determine an average rate of change for the key value over the time period.

4. The method of claim 1, wherein determining a set of key values relevant to the event comprises:
    querying a key-value data store based on the identified category.

5. The method of claim 4, further comprising:
    receiving, from a user, an indication of a new key value;
    identifying one or more input variables related to the new key value;
    generating, based on the one or more input variables, a new key-value mapping to be associated with the new key value; and
    updating the one or more key-value mappings to include the new key-value mapping.

6. The method of claim 5, wherein the new key value is generated automatically.

7. The method of claim 1, wherein the some multiple value is determined as being inversely proportional to an amount of time that has transpired between the event and the last update to the key value.

8. An event processing engine comprising:
    a processor, and a memory including instructions that, when executed with the processor, cause the event processing engine to, at least:

maintain, in a data store for each of a number of event types, one or more key-value mappings between the event type and a different set of key values, the one or more key-value mappings indicating each key value in the different set of key values that is affected by an event of the event type as well as instructions for updating the key value;

maintain, in the data store for each key value stored by the data store, a corresponding key log indicating a current aggregate value of the key value;

receive an event notification that includes information associated with an event, wherein one or more data values in the data store are to be updated in accordance with the event, the one or more data values being separate from the set of key values;

determine, based on the information associated with the event, a set of key-value mappings associated with the event, wherein the set of key values being determined by querying the data store based on an event type associated with the event and identifying a category of an item associated with the event;

determine, based on the set of key values, a set of key logs associated with the set of key values;

update the set of key values associated with the set of key-value mappings in accordance with the set of key-value mappings; and update each of the set of key logs associated with the set of key values to include an aggregate data value for a corresponding key value of the set of key values and a time at which the update to the set of key values was made, wherein the aggregate data value differs from the one or more data values in the data store updated in accordance with the event, the aggregate data value for the corresponding key value of the set of key values updated by multiplying the current aggregate value of the key value by some multiple value and then adding a new value from the information associated with the event to the multiplied current aggregate value, wherein said some multiple value is based on an amount of time that has transpired between a current event and a last update to the key value.

9. The event processing engine of claim 8, wherein the event notification is associated with a transaction.

10. The event processing engine of claim 8, wherein the event notification is received from a transaction processing network.

11. The event processing engine of claim 8, wherein the event notification is generated automatically.

12. The event processing engine of claim 8, wherein each key-value mapping of the set of key-value mappings comprise an xml file.

13. The event processing engine of claim 8, wherein a record includes only the aggregate data value and a timestamp.

14. The event processing engine of claim 8, wherein updating the set of key values associated with the set of key-value mappings comprises:
subjecting the information to a function included in the key-value mapping.

15. The event processing engine of claim 14, wherein the function is an edge function.

16. The event processing engine of claim 8, instructions further cause the event processing engine to update a set of derivative key values associated with the set of key-value mappings.

17. A processing node apparatus comprising:
a processor; and
a memory including instructions that, when executed with the processor, cause the processing node to, at least:

maintain, for each of a plurality key values, one or more key-value mappings between the key value and a different set of data values in a data store;

maintain, for each of a plurality of key values, a corresponding key log indicating a current aggregate value of the key value;

receive a notification generated upon occurrence of an event, wherein one or more data values in the data store are to be updated in accordance with the event, the set of data values being separate from the plurality of key values;

identify, within the notification, a plurality of factors relevant to one or more key values, wherein the one or more key values is identified as being relevant to the plurality of factors based on the plurality of factors matching a set of factors mapped to the one or more key values and identifying a category of an item associated with the event;

determine, based on the one or more key values, one or more key logs associated with the one or more key values;

identify, for each key value in the one or more key values, a key-value mapping that includes instructions for updating an aggregate value stored in relation to the key value;

update each key value of the one or more key values based at least in part on the key-value mapping; and for each key value of the one or more key values, update a key-value log of the one or more key logs associated with the one or more key values to include an aggregate data value for a corresponding key value of the one or more key values, wherein the aggregate data value differs from the one or more data values in the data store updated in accordance with the event, the aggregate data value for the corresponding key value of the one or more key values updated by multiplying the current aggregate value of the key value by some multiple value and then adding a new value from first information associated with the event to the multiplied current aggregate value, wherein said some multiple value is based on an amount of time that has transpired between a current event and a last update to the key value.

18. The processing node apparatus of claim 17, wherein the key-value log includes past data associated with updates to the key value.

19. The processing node apparatus of claim 17, wherein the event is a purchase transaction between two parties for a particular item, and wherein the plurality of factors includes at least one of a type associated with the item, second information associated with the two parties, or third information related to an amount of the purchase transaction.

* * * * *